(12) United States Patent
Farrand et al.

(10) Patent No.: US 9,386,148 B2
(45) Date of Patent: Jul. 5, 2016

(54) IDENTIFYING AND FILTERING INCOMING TELEPHONE CALLS TO ENHANCE PRIVACY

(71) Applicants: Toby Farrand, Palo Alto, CA (US); Kevin Snow, Granite Bay, CA (US); Dennis Peng, Palo Alto, CA (US)

(72) Inventors: Toby Farrand, Palo Alto, CA (US); Kevin Snow, Granite Bay, CA (US); Dennis Peng, Palo Alto, CA (US)

(73) Assignee: Ooma, Inc., Palo Alto, CA (US)

( * ) Notice: Subject to any disclaimer, the term of this patent is extended or adjusted under 35 U.S.C. 154(b) by 0 days.

(21) Appl. No.: 14/034,457

(22) Filed: Sep. 23, 2013

(65) Prior Publication Data

US 2015/0086001 A1 Mar. 26, 2015

(51) Int. Cl.
| | | |
|---|---|---|
| H04M 3/436 | (2006.01) | |
| H04W 4/16 | (2009.01) | |
| H04M 1/00 | (2006.01) | |
| H04M 1/663 | (2006.01) | |

(52) U.S. Cl.
CPC ............ *H04M 3/436* (2013.01); *H04M 1/00* (2013.01); *H04M 1/663* (2013.01); *H04M 3/4365* (2013.01); *H04W 4/16* (2013.01)

(58) Field of Classification Search
USPC ................. 379/188, 210.02, 210.03
See application file for complete search history.

(56) References Cited

U.S. PATENT DOCUMENTS

| | | | |
|---|---|---|---|
| 5,425,085 A | 6/1995 | Weinberger et al. | |
| 5,519,769 A | 5/1996 | Weinberger et al. | |
| 5,796,736 A | 8/1998 | Suzuki | |
| 6,023,724 A | 2/2000 | Bhatia et al. | |
| 6,377,938 B1 | 4/2002 | Block et al. | |
| 6,487,197 B1 | 11/2002 | Elliott | |
| 6,615,264 B1 | 9/2003 | Stoltz et al. | |
| 6,697,358 B2 | 2/2004 | Bernstein | |
| 6,714,545 B1 | 3/2004 | Hugenberg et al. | |
| 6,775,267 B1 | 8/2004 | Kung et al. | |
| 6,778,528 B1 | 8/2004 | Blair et al. | |
| 6,934,258 B1 | 8/2005 | Smith et al. | |
| 7,124,506 B2 | 10/2006 | Yamanashi et al. | |
| 7,127,043 B2 | 10/2006 | Morris | |
| 7,127,506 B1 | 10/2006 | Schmidt et al. | |
| 7,154,891 B1 | 12/2006 | Callon | |

(Continued)

FOREIGN PATENT DOCUMENTS

| | | |
|---|---|---|
| WO | WO2015041738 | 3/2015 |
| WO | 2015179120 | 11/2015 |
| WO | 2016007244 | 1/2016 |

OTHER PUBLICATIONS

International Search Report and Written Opinion mailed Nov. 7, 2014 for App. No. PCT/US2014/44945, filed Jun. 30, 2014.

(Continued)

*Primary Examiner* — Harry S Hong
(74) *Attorney, Agent, or Firm* — Carr & Ferrell LLP

(57) ABSTRACT

A method for filtering a telephone call is provided. The method may comprise receiving from a caller the telephone call directed to a communication device associated with an intended call recipient. The received telephone call may be scored based on predetermined scoring criteria to create a score indicative of a desirability of the telephone call. Furthermore, the method may comprise comparing the score to a predetermined threshold score. Based on the comparison, the method may further comprise selectively classifying the telephone call as an unwanted telephone call. Furthermore, the method may comprise selectively rejecting the unwanted telephone call.

19 Claims, 10 Drawing Sheets

(56) References Cited

U.S. PATENT DOCUMENTS

| | | | |
|---|---|---|---|
| 7,295,660 B1* | 11/2007 | Higginbotham et al. | 379/196 |
| 7,342,925 B2 | 3/2008 | Cherchali et al. | |
| 7,376,124 B2 | 5/2008 | Lee et al. | |
| 7,394,803 B1 | 7/2008 | Petit-Huguenin et al. | |
| 8,331,547 B2* | 12/2012 | Smith et al. | 379/211.01 |
| 8,350,694 B1 | 1/2013 | Trundle et al. | |
| 8,515,021 B2 | 8/2013 | Farrand et al. | |
| 9,225,626 B2 | 12/2015 | Capper et al. | |
| 2001/0053194 A1 | 12/2001 | Johnson | |
| 2002/0016718 A1 | 2/2002 | Rothschild et al. | |
| 2002/0035556 A1 | 3/2002 | Shah et al. | |
| 2002/0037750 A1 | 3/2002 | Hussain et al. | |
| 2002/0038167 A1 | 3/2002 | Chimomas | |
| 2002/0085692 A1 | 7/2002 | Katz | |
| 2002/0140549 A1 | 10/2002 | Tseng | |
| 2002/0165966 A1 | 11/2002 | Widegren et al. | |
| 2003/0058844 A1 | 3/2003 | Sojka et al. | |
| 2003/0099334 A1 | 5/2003 | Contractor | |
| 2003/0141093 A1 | 7/2003 | Tirosh et al. | |
| 2003/0164877 A1 | 9/2003 | Murai | |
| 2003/0184436 A1 | 10/2003 | Seales et al. | |
| 2003/0189928 A1 | 10/2003 | Xiong | |
| 2004/0010472 A1 | 1/2004 | Hilby et al. | |
| 2004/0010569 A1 | 1/2004 | Thomas et al. | |
| 2004/0059821 A1 | 3/2004 | Tang et al. | |
| 2004/0086093 A1 | 5/2004 | Schranz | |
| 2004/0090968 A1 | 5/2004 | Kimber et al. | |
| 2004/0105444 A1 | 6/2004 | Korotin et al. | |
| 2004/0160956 A1 | 8/2004 | Hardy et al. | |
| 2005/0027887 A1 | 2/2005 | Zimler et al. | |
| 2005/0036590 A1 | 2/2005 | Pearson et al. | |
| 2005/0074114 A1 | 4/2005 | Fotta et al. | |
| 2005/0078681 A1 | 4/2005 | Sanuki et al. | |
| 2005/0089018 A1 | 4/2005 | Schessel | |
| 2005/0097222 A1 | 5/2005 | Jiang et al. | |
| 2005/0105708 A1 | 5/2005 | Kouchri et al. | |
| 2005/0141485 A1 | 6/2005 | Miyajima et al. | |
| 2005/0169247 A1 | 8/2005 | Chen | |
| 2005/0222820 A1 | 10/2005 | Chung | |
| 2005/0238034 A1 | 10/2005 | Gillespie et al. | |
| 2005/0259637 A1 | 11/2005 | Chu et al. | |
| 2006/0007915 A1 | 1/2006 | Frame | |
| 2006/0009240 A1 | 1/2006 | Katz | |
| 2006/0013195 A1 | 1/2006 | Son et al. | |
| 2006/0114894 A1 | 6/2006 | Cherchali et al. | |
| 2006/0140352 A1 | 6/2006 | Morris | |
| 2006/0156251 A1 | 7/2006 | Suhail et al. | |
| 2006/0167746 A1 | 7/2006 | Zucker | |
| 2006/0251048 A1 | 11/2006 | Yoshino et al. | |
| 2006/0258341 A1 | 11/2006 | Miller et al. | |
| 2006/0259767 A1 | 11/2006 | Mansz et al. | |
| 2007/0036314 A1 | 2/2007 | Kloberdans et al. | |
| 2007/0037560 A1 | 2/2007 | Yun et al. | |
| 2007/0041517 A1 | 2/2007 | Clarke et al. | |
| 2007/0054645 A1 | 3/2007 | Pan | |
| 2007/0061735 A1 | 3/2007 | Hoffberg et al. | |
| 2007/0071212 A1 | 3/2007 | Quittek et al. | |
| 2007/0118750 A1 | 5/2007 | Owen et al. | |
| 2007/0121593 A1 | 5/2007 | Vance et al. | |
| 2007/0121596 A1 | 5/2007 | Kurapati et al. | |
| 2007/0133757 A1 | 6/2007 | Girouard et al. | |
| 2007/0153776 A1 | 7/2007 | Joseph et al. | |
| 2007/0165811 A1 | 7/2007 | Reumann et al. | |
| 2007/0183407 A1 | 8/2007 | Bennett et al. | |
| 2007/0203999 A1 | 8/2007 | Townsley et al. | |
| 2007/0283430 A1 | 12/2007 | Lai et al. | |
| 2007/0298772 A1 | 12/2007 | Owens et al. | |
| 2008/0049748 A1 | 2/2008 | Bugenhagen et al. | |
| 2008/0075248 A1 | 3/2008 | Kim | |
| 2008/0075257 A1* | 3/2008 | Nguyen et al. | 379/210.02 |
| 2008/0084975 A1 | 4/2008 | Schwartz | |
| 2008/0097819 A1 | 4/2008 | Whitman | |
| 2008/0111765 A1 | 5/2008 | Kim | |
| 2008/0125095 A1 | 5/2008 | Mornhineway et al. | |
| 2008/0144625 A1 | 6/2008 | Wu et al. | |
| 2008/0159515 A1 | 7/2008 | Rines | |
| 2008/0168145 A1 | 7/2008 | Wilson | |
| 2008/0196099 A1 | 8/2008 | Shastri | |
| 2008/0225749 A1 | 9/2008 | Peng et al. | |
| 2008/0247401 A1 | 10/2008 | Bhal et al. | |
| 2008/0298348 A1 | 12/2008 | Frame et al. | |
| 2008/0313297 A1 | 12/2008 | Heron et al. | |
| 2008/0316946 A1 | 12/2008 | Capper et al. | |
| 2009/0106318 A1 | 4/2009 | Mantripragada et al. | |
| 2009/0135008 A1 | 5/2009 | Kirchmeier et al. | |
| 2009/0168755 A1 | 7/2009 | Peng et al. | |
| 2009/0213999 A1 | 8/2009 | Farrand et al. | |
| 2009/0253428 A1 | 10/2009 | Bhatia et al. | |
| 2009/0303042 A1 | 12/2009 | Song et al. | |
| 2009/0319271 A1 | 12/2009 | Gross | |
| 2010/0046530 A1 | 2/2010 | Hautakorpi et al. | |
| 2010/0046731 A1 | 2/2010 | Gisby et al. | |
| 2010/0098235 A1 | 4/2010 | Cadiz et al. | |
| 2010/0114896 A1 | 5/2010 | Clark et al. | |
| 2010/0136982 A1 | 6/2010 | Zabawskyj et al. | |
| 2010/0191829 A1 | 7/2010 | Cagenius | |
| 2010/0229452 A1 | 9/2010 | Suk | |
| 2010/0302025 A1 | 12/2010 | Script | |
| 2011/0054689 A1 | 3/2011 | Nielsen et al. | |
| 2011/0111728 A1 | 5/2011 | Ferguson et al. | |
| 2011/0140868 A1 | 6/2011 | Hovang | |
| 2011/0170680 A1* | 7/2011 | Chislett et al. | 379/142.06 |
| 2011/0183652 A1* | 7/2011 | Eng et al. | 455/414.1 |
| 2011/0265145 A1 | 10/2011 | Prasad et al. | |
| 2012/0027191 A1 | 2/2012 | Baril et al. | |
| 2012/0036576 A1 | 2/2012 | Iyer | |
| 2012/0099716 A1 | 4/2012 | Rae et al. | |
| 2012/0284778 A1 | 11/2012 | Chiou et al. | |
| 2012/0329420 A1 | 12/2012 | Zotti et al. | |
| 2013/0018509 A1 | 1/2013 | Korus | |
| 2013/0035774 A1 | 2/2013 | Warren et al. | |
| 2013/0293368 A1 | 11/2013 | Ottah et al. | |
| 2013/0336174 A1 | 12/2013 | Rubin et al. | |
| 2014/0022915 A1 | 1/2014 | Caron et al. | |
| 2014/0084165 A1 | 3/2014 | Fadell et al. | |
| 2014/0085093 A1 | 3/2014 | Mittleman et al. | |
| 2014/0101082 A1 | 4/2014 | Matsuoka et al. | |
| 2014/0120863 A1 | 5/2014 | Ferguson et al. | |
| 2014/0169274 A1 | 6/2014 | Kweon et al. | |
| 2014/0306802 A1 | 10/2014 | Hibbs, Jr. | |
| 2015/0087280 A1 | 3/2015 | Farrand et al. | |
| 2015/0100167 A1 | 4/2015 | Sloo et al. | |
| 2015/0262435 A1 | 9/2015 | Delong et al. | |
| 2015/0339912 A1 | 11/2015 | Farrand et al. | |
| 2016/0012702 A1 | 1/2016 | Hart et al. | |

OTHER PUBLICATIONS

International Search Report and Written Opinion mailed Jul. 27, 2015 for App. No. PCT/US2015/029109, filed May 4, 2015.
International Search Report and Written Opinion mailed Nov. 2, 2015 for App. No. PCT/US2015/034054, filed Jun. 3, 2015.
"Life Alert's Four Layers of Protection, First Layer of Protection: Protection at Home." Life Alert. https://web.archive.org/web/20121127094247/http://www.lifealert.net/products/homeprotection.html. [retrieved Oct. 13, 2015].

* cited by examiner

IDENTIFYING AND FILTERING INCOMING TELEPHONE CALLS TO ENHANCE PRIVACY

TECHNICAL FIELD

This disclosure relates generally to privacy protection of telephone calls and, more particularly, to blocking of unwanted incoming telephone calls.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

With development of telephone communications, the number of parties offering services via telephone has increased. Telephone calls from these parties, such as telemarketers, pollsters, and charitable organizations, sometimes referred to as spam calls, robocalls, or junk calls, are typically unsolicited, placed in bulk and made indiscriminately. Telemarketers employ increasingly sophisticated technology to get their calls through to their target audience in spite of people's desire to be left alone. Furthermore, telemarketers can employ computers to dial a number until the call is answered, so they can automatically transfer the call to a human agent. This can be heard as a pause after the phone call is answered but before the called party can speak to the human agent.

Consumers can employ a variety of defenses against undesired callers. Some telephone services can allow anonymous call reject so that the phone does not ring if the caller Identification (ID) is blocked. Unfortunately, this strategy can prevent the receipt of calls from anyone who has set their outbound caller ID to be blocked in an attempt to maintain privacy. Legislation has been passed allowing consumers to opt out of receiving calls from telemarketers by adding their phone number to a national "do-not-call" list. However, the effectiveness of this list has been undermined by the fact that it does not apply to political organizations and charities, many telemarketers ignore the list, and the prohibition does not apply to any entity that has previously conducted business with the target. Some privacy protection techniques can employ a "whitelist" of known acceptable callers and a "blacklist" of known undesired callers, but blocking only blacklisted numbers often lets too many "junk" calls through due to the blacklist being incomplete, while allowing only calls from whitelisted numbers may be too restrictive. Moreover, managing blacklists and whitelists manually can be bothersome and often is not worth the effort.

In the meantime, computational power and network databases have advanced so much that a network operator can employ far more sophisticated and automated means for protecting privacy of the user more accurately and with minimal interaction with the user. Current methods of spam blocking are inadequate and a new approach to privacy protection is needed in the field.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to various techniques for filtering telephone calls. Specifically, a method for filtering a telephone call may comprise receiving, from a caller, a telephone call directed to a communication device associated with an intended call recipient. The received telephone call may be scored based on predetermined scoring criteria to create a score indicative of a desirability of the telephone call. Furthermore, the method may comprise comparing the score to a predetermined threshold score. The method may further comprise selectively classifying, based on the comparison, the telephone call as an unwanted telephone call. Furthermore, the method may comprise selectively rejecting the unwanted telephone call.

According to another approach of the present disclosure, there is provided a system for filtering a telephone call. The system may comprise a processor. The processor may be configured to receive, from a caller, the telephone call directed to a communication device associated with an intended call recipient. The processor may be further configured to score the telephone call based on predetermined scoring criteria to create a score indicative of a desirability of the telephone call. Furthermore, the processor may compare the created score to a predetermined threshold score and, based on the comparison, selectively classify the telephone call as an unwanted telephone call. Furthermore, the processor may selectively reject the unwanted telephone call. The system may further comprise a memory unit configured to store data associated with the predetermined scoring criteria, the predetermined threshold score, a whitelist, and a blacklist.

In further example embodiments of the present disclosure, the method steps are stored on a machine-readable medium comprising instructions, which when implemented by one or more processors perform the recited steps. In yet further example embodiments, hardware systems, or devices can be adapted to perform the recited steps. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements and in which.

DETAILED DESCRIPTION

Figure 1:
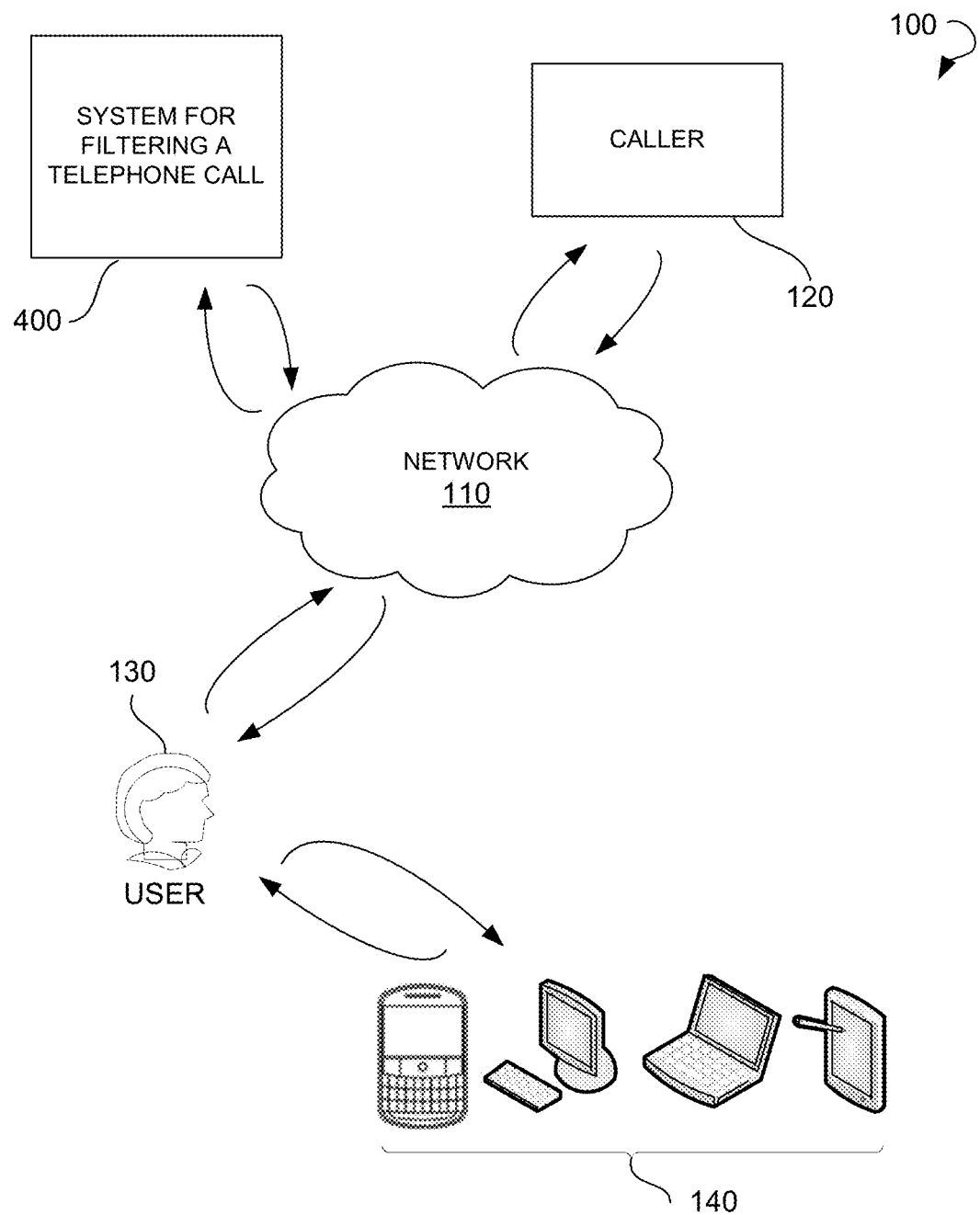
FIG. 1 shows an environment within which a method and a system for filtering a telephone call can be implemented, according to an example embodiment.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, a tablet computer, a laptop computer, and a server), game console, handheld gaming device, cellular phone, smart phone, smart television system, and so forth.

The present disclosure relates to a network-oriented, integrated and automated approach to avoid unwanted calls by exploiting the capabilities of a phone network and to provide sophisticated handling of incoming calls. In addition to user-defined blacklists (i.e., lists comprising numbers known to be associated with undesired callers) and whitelists (i.e., lists comprising numbers known to be associated with acceptable callers), the present disclosure implements processes for enhancing and automating creation of blacklists and whitelists and for scoring the likelihood of allowance of a call from an unfamiliar (but not anonymous) caller. The resulting scores may be used to provide the user with a control over calls from unfamiliar callers.

Various criteria may be used to score calls. For example, call desirability may be assessed based on network statistics gathered across the entire user base of the network, community whitelists and blacklists, and callbacks. Furthermore, machine detection may be employed to determine whether the caller is an automated system or a human. In an example embodiment, customized challenge and response may be used to provide the user with an opportunity to determine whether unfamiliar callers are known to the user and whether calls from the unfamiliar callers should be put through or blocked.

Thus, as a result of filtering a telephone call directed to privacy protection of the user, the call may be either rejected or put through to the user. During the scoring process, callers can be added to the community blacklist or whitelist or to a personal blacklist or whitelist of the person being called. If the call is put through, the system may provide the user with a user interface to allow the system to add the caller to the blacklist or the whitelist to streamline handling of calls from the same caller in the future. Alternatively, additions to the blacklist and whitelist may be automated based on programmed rules prescribing flow of the call through the privacy protection system. Individual blacklists and whitelists may serve as resources to help determine the routing of future calls from the same callers to other users of the network. Additionally, preventive actions may be performed with regard to the undesired callers, such as automatically logging a complaint to an authority responsible for telephone call privacy identifying the caller as violating provisions related to the national "do-not-call" list. For the calls rejected by the system, the user may have several options for treating those calls to maximize the cost to the caller for having called, thereby increasing the chances that the caller will not call again and providing a measure of satisfaction to the user.

Referring now to the drawings, FIG. 1 illustrates an environment 100 within which a system and a method for filtering a telephone call can be implemented. The environment 100 may include a network 110, a system 400 for filtering a telephone call, a caller 120, and a user 130 being an intended call recipient and having one or more user communication devices 140. The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 may include a network of data processing nodes that are interconnected for the purpose of data communication. Furthermore, the network 110 may include a telephone network, such as a voice over Internet Protocol (VoIP) network.

The user communication device 140 may include a mobile phone, a smartphone, a tablet Personal Computer (PC), a laptop, a PC, and so forth. For the purposes of communication, the user communication device 140 may be compatible with one or more of the following network standards: GSM, CDMA, Long Term Evolution (LTE), IMS, Universal Mobile Telecommunication System (UMTS), 4G, 5G, 6G and upper, Radio-Frequency Identification (RFID), and so forth.

As shown, the caller 120 may perform a telephone call to the user communication device 140 via the network 110. The system 400 may be associated with the user communication device 140 to filter telephone calls from unwanted callers.

Figure 2:
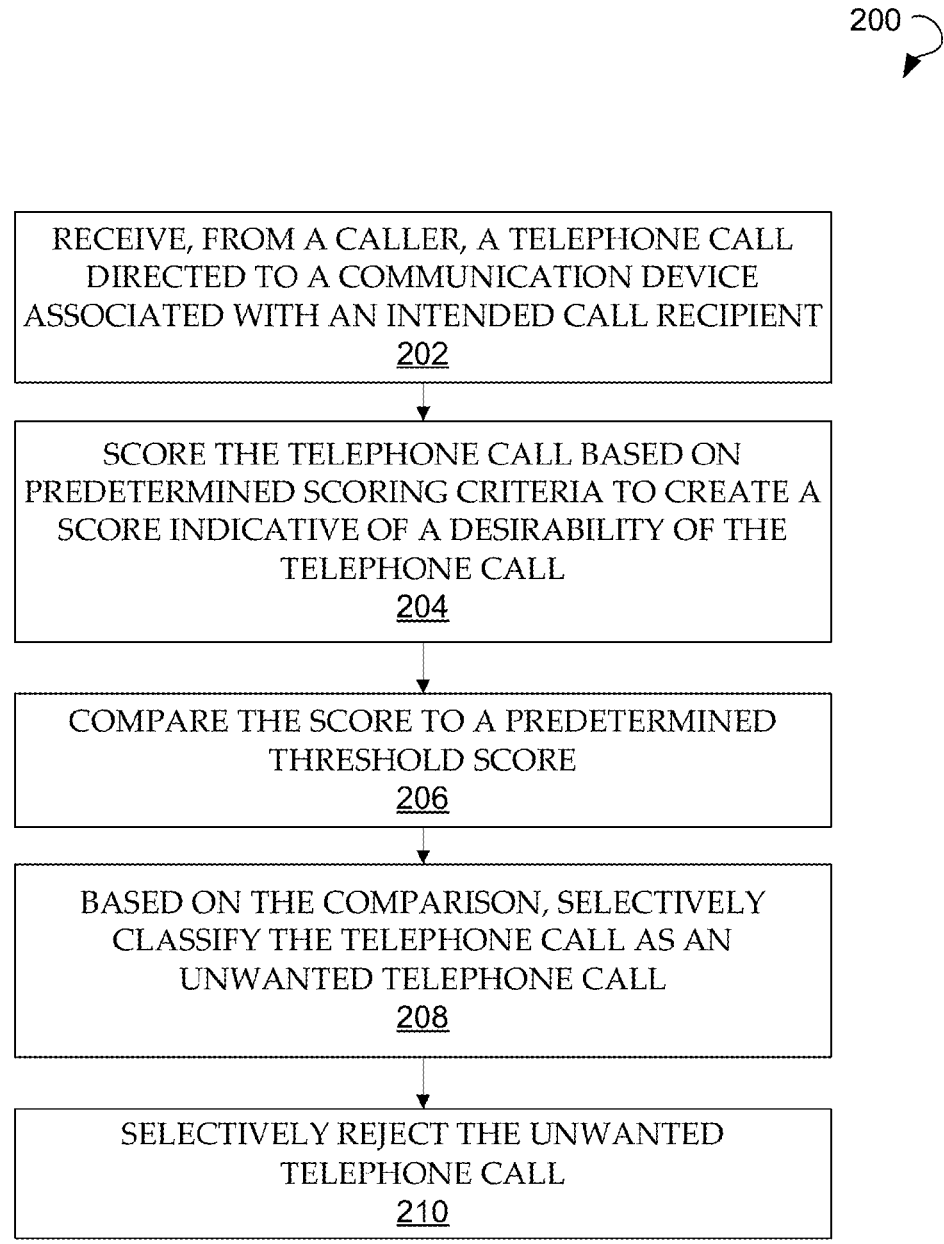
FIG. 2 is a process flow diagram showing a method for filtering a telephone call, according to an example embodiment.

FIG. 2 is a flow chart illustrating a method 200 for filtering a telephone call, in accordance with an example embodiment. The method 200 may be performed by processing logic that may comprise hardware (e.g., decision making logic, dedicated logic, programmable logic, and microcode), software (such as software run on a general-purpose computer system or a dedicated machine), or a combination of both.

In the example shown, the method 200 may commence at operation 202 with receiving, by a processor, from a caller, the telephone call directed to a communication device associated with an intended call recipient. The method 200 may continue with operation 204, at which the processor may score the telephone call based on predetermined scoring criteria to create a score indicative of a desirability of the telephone call.

In an example embodiment, the scoring may be based on whether a caller or a caller communication device are associated with a whitelist, a blacklist, or a graylist. Furthermore, the scoring may be based on a number of calls made to different phone numbers by the caller, sequence of the calls made by the caller, and call sources. The predetermined scoring criteria may involve network statistics, machine detections, customized challenge and response, and so forth. In some embodiments, the predetermined scoring criteria may be provided by the intended call recipient.

At operation 206, the processor may compare the created score to a predetermined threshold score. In an example embodiment, the predetermined threshold score may be selected by the intended call recipient or set by the processor. The method 200 may continue to operation 208, at which, based on the comparison, the processor may selectively classify the telephone call as an unwanted telephone call.

At operation 210, the processor may selectively reject the unwanted telephone call. In an example embodiment, the telephone call may be automatically rejected if a caller ID associated with the telephone call is blocked or the call is anonymous. In an example embodiment, the method 200 may optionally comprise, based on the score, putting the telephone call through to the communication device.

Furthermore, based on the score, the caller or a caller communication device may be added to a whitelist or a blacklist. In an example embodiment, the intended call recipient may manually add the caller or caller communication device to the blacklist or the whitelist.

In an example embodiment, the method 200 may optionally comprise providing screening of the telephone call by the intended call recipient to allow the intended call recipient to manually reject or allow the telephone call. Furthermore, the intended call recipient may be allowed to grade the telephone call or effectiveness of the screening after the telephone call is completed.

Figure 3:
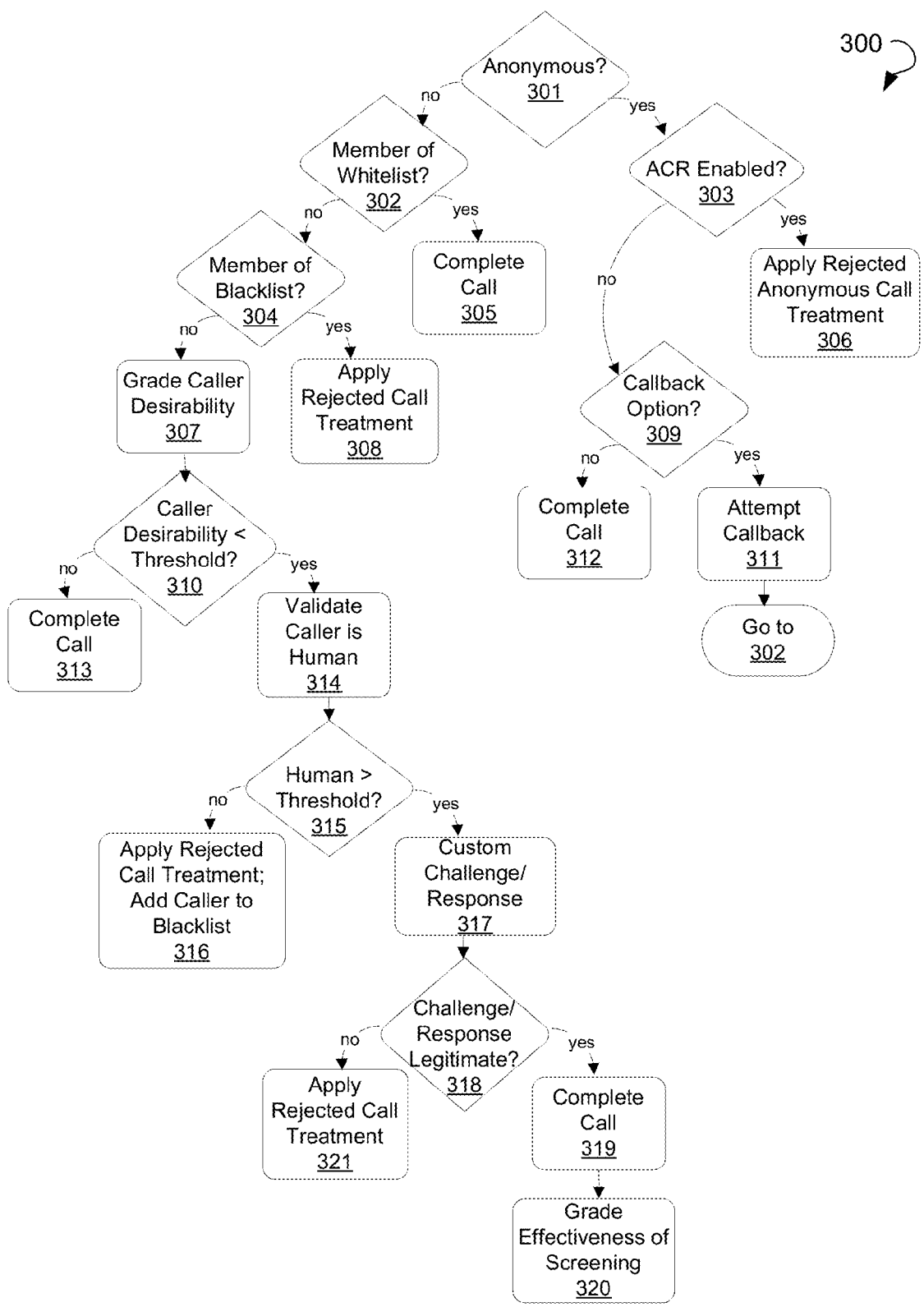
FIG. 3 is a flow chart showing handling of an inbound call, according to an example embodiment.

In an example embodiment, the method 200 may comprise automatically requiring a call back number to complete the telephone call. In an example embodiment, the method 200 may optionally comprise providing a test to establish whether the caller is a human. The method 200 is further illustrated in detail in FIG. 3 showing a scheme 300 for handling of an inbound call. The inbound call may include a call from a caller to an intended call recipient before being put through to the intended call recipient and before being rejected.

In a telephone network, such as a VoIP network, at step 301 it may be determined that the caller ID associated with the inbound call is blocked or anonymous. In such a case, at step 303, it may be ascertained whether the intended call recipient has enabled anonymous call reject (ACR). In case the intended call recipient has enabled ACR, the call may be rejected at step 306. If, on the other hand, the intended call recipient has not enabled ACR, it may be ascertained, at step 309, whether further screening, namely a callback option, is enabled by the intended call recipient. If the callback option is not enabled for the inbound anonymous calls, the call may be completed at step 312. In some example embodiments, if it is determined, at step 309, that the callback option is not enabled for the inbound anonymous calls, method 300 may proceed to step 307 (described below) instead of completing the call directly.

If further screening is desired, the call flow may be passed to step 311 where a callback may be attempted. In this case, the call may be answered and the caller asked by an interactive voice response system (IVR) to provide a number at which the caller may be reached. Typically, undesired callers, such as telemarketers, may not have direct phone numbers at which they can be reached. Therefore, requiring the callback may help in overcoming spam attempts. In case of receiving the number at which the caller may be reached, the current call may be ended and the process may proceed with step 302 described below.

It is important to note that for telephone networks in general, and VoIP networks in particular, functions such as callbacks and IVRs can be implemented without tying up the phone line of the intended call recipient or inhibiting the use of the service by the intended call recipient. From the perspective of the intended call recipient, a system for filtering a telephone call may operate in the background and in general may be invisible to the intended call recipient.

For an inbound call where a caller ID may be available (or where a callback number has been obtained), the whitelist of previously identified acceptable callers of the intended call recipient may be queried at step 302. If the caller is on the whitelist, the call may be completed at step 305. If the caller is not on the white list, the blacklist associated with the intended call recipient may be queried at step 304. A call from the callers on the blacklist may be rejected at step 308. For the callers who are neither on the whitelist nor on the blacklist, the desirability of the caller can be established in step 307. In step 307, the call may be answered by the automated system with a greeting such as 'Who is calling?' The system purposely may have a short greeting asking a question so that it may measure the pause between the connecting of the call and the first words of the caller. If the pause is three seconds or longer, the call may be connected by an auto dialer and the telemarketer may never hear the greeting from the system. If the caller responds with 'Hello' it may be an indication that he did not hear the question because of the time lag introduced by the auto dialer. This may be the first measurement to be considered in grading the desirability of the caller. The desirability of the caller may be scored, and the resulting score may be compared with a predetermined threshold score at step 310. The predetermined threshold score may be defined by the system or selected by the intended call recipient. If the desirability score of the caller is higher than the predetermined threshold score, the caller may be classified as a desirable caller and the call may be put through to the intended call recipient at step 313. (See FIG. 7 and discussion below for further details of the desirability rating.)

At step 314, if the desirability score of the caller is below the predetermined threshold score, the intended call recipient may configure the system to provide further assurances that the call is worth taking by attempting to determine whether the caller is human and not an automated system. In an example embodiment, the determining whether the caller is human may be based on the IVR asking the caller to add two numbers. The score indicative of whether the caller is human may range from 1-100. This score may be used at step 315 to determine whether to reject the call. If the score associated with the caller fails to exceed the threshold score value of step 315, the call may be rejected and the caller may be added to the blacklist at step 316.

If the caller is determined to be human, the system may be configured to issue a customized challenge/response at step 317 to determine whether the caller should be allowed to complete the call. The customized challenge/response, employing the IVR and call recording mechanism, may be used to determine whether the caller is an acquaintance of the intended call recipient or to classify the caller as an undesired caller, such as a collection agent or a solicitor. The interactions of the challenge/response may be recorded for future use in documenting the violation by the caller of the rules related to the national "do-not-call" list. A customized challenge/response may comprise the IVR asking a question or series of questions of a personal nature that could only be answered by an acquaintance of the intended call recipient. The answer may require personal knowledge of the intended call recipient that an undesired caller, such as a telemarketer, may not possess. A small number of such questions could determine familiarity and, therefore, legitimacy of the caller at step 318. A call from an illegitimate caller may be rejected at step 321, while a call from a legitimate caller may be put through to the intended call recipient at step 319. With proper whitelist handling, only one pass through the question and answer process may be required for any legitimate caller. For subsequent calls from that caller, the whitelist may identify the caller as legitimate and the call may be connected without delay.

At step 320, once the call has been completed via any path through step 307, the intended call recipient may be given an opportunity, through an intended call recipient interface, to grade effectiveness of the screening. This feedback may allow the intended call recipient to put the caller onto a personal whitelist or blacklist in order to streamline processing of future calls from that caller.

Figure 4:
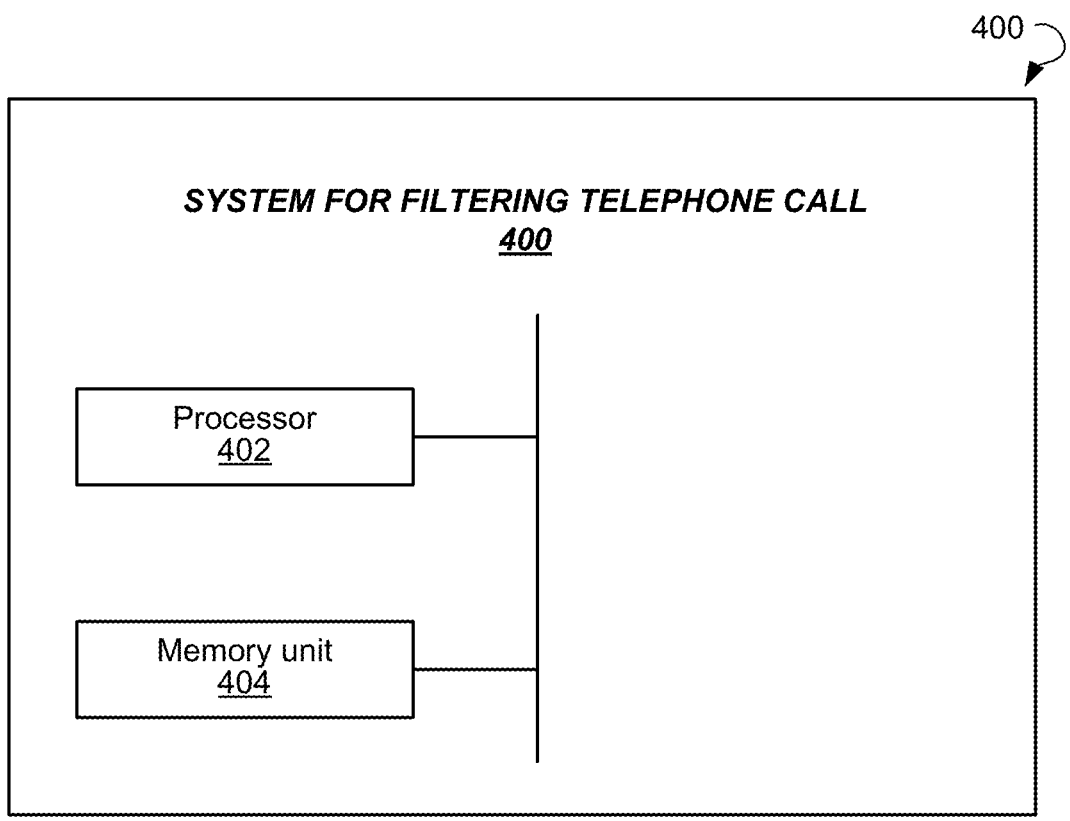
FIG. 4 is a block diagram showing various modules of a system for filtering a telephone call, according to an example embodiment.

FIG. 4 is a block diagram showing various modules of an exemplary system 400 for filtering telephone calls. Specifically, the system 400 may include a processor 402. The processor 402 may be configurable to receive a telephone call from a caller directed to a communication device associated with an intended call recipient. The processor 402 may score the received telephone call based on predetermined scoring criteria and create a score indicative of a desirability of the telephone call. The processor 402 may further compare the score to a predetermined threshold score. The predetermined threshold score may be selected by the intended call recipient or set by the processor 402. Based on the comparison, the processor 402 may be configured to selectively classify the telephone call as an unwanted telephone call and to selectively reject the unwanted telephone call.

In an example embodiment, the processor may be configured, based on the score, to selectively classify the telephone call as a wanted telephone call and put the telephone call through to the communication device of the intended call recipient. In an example embodiment, the processor may be configured, based on the score, to add the caller or a caller communication device to the whitelist or the blacklist.

In an example embodiment, the processor may be configured to automatically require a call back number to complete the telephone call. If the caller is unable to provide a call back number, the processor may be configured to reject the call.

In an example embodiment, the processor may be configured to provide a test to establish whether the caller is a human. If the caller passes the test, the processor may put the call through to the intended call recipient. If the caller fails the test, the processor may reject the call.

In a further example embodiment, the processor may be further configured to provide screening of the telephone call by the intended call recipient to allow the intended call recipient to manually reject or allow the telephone call. The intended call recipient may be further allowed to grade the telephone call or effectiveness of the screening after the telephone call is completed.

The system 400 may comprise a memory unit 404 configured to store data associated with the predetermined scoring criteria, the predetermined threshold score, a whitelist, a blacklist, and so forth.

Figure 5:
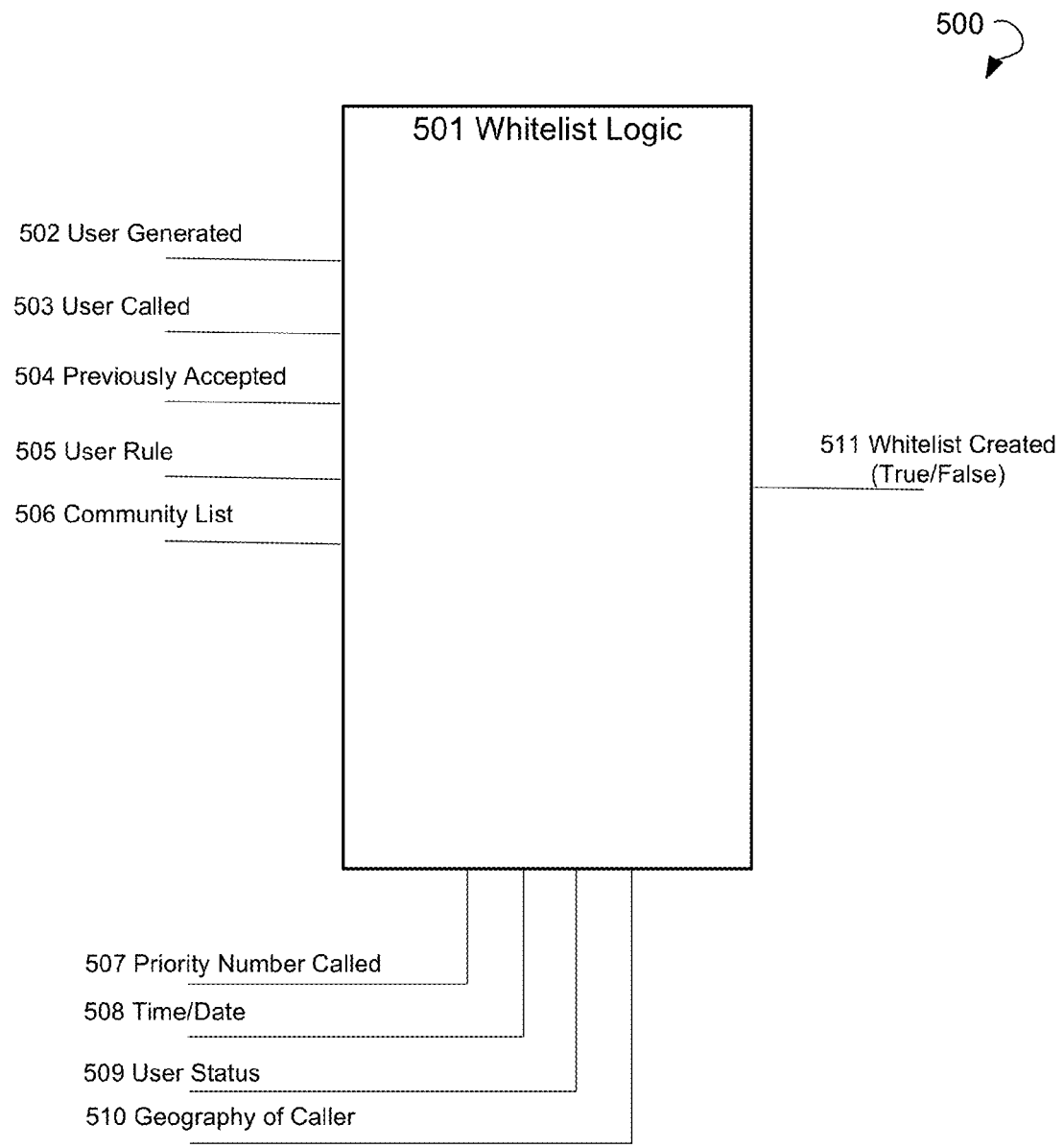
FIG. 5 is a flow chart showing logic for creating a whitelist, according to an example embodiment.

FIG. 5 shows a flow chart 500 illustrating how the whitelist may be composed and evaluated for driving the decision in step 302 of FIG. 3. The whitelist may consist of numbers from which a user (i.e., an intended call recipient) wishes to receive calls. The user may be given several options as to what numbers may be included in the whitelist. Alternatively, the system 400 may be configured with a set of predetermined options for including a number in the whitelist. The list of options may include user generated numbers 502 (i.e., the numbers that the user enters as permitted numbers). Furthermore, the list of options may include numbers previously called by the user 503. The list of options may further include previously accepted numbers 504 (i.e., the numbers from callers whose calls were previously accepted by the user and were not subsequently removed from the whitelist or blacklisted). Furthermore, the list of options may include user rule numbers 505 (i.e., numbers from particular geographic locations, area codes or number wildcards, e.g., calls from a home town of the user, as determined by the area code). The list of options may comprise community list numbers 506 (i.e., numbers present in a public list).

The list of options may further include numbers calling special phone numbers 507 to which the user may give priority. For example, a user may have a virtual number that the user may provide to family or acquaintances known to be legitimate. The calls to this number may bypass the screening process entirely even for unfamiliar or blocked calling numbers.

FIG. 5 shows how various whitelists can be qualified against time/date criteria 508, such as time of day, day of week, or time of year; geographic location 510 of the caller as determined by the caller ID; or user status 509. These various lists and criteria may be combined in logic block 501 to produce a decision 511 as to whether the caller should definitely be allowed to complete the call.

Figure 6:
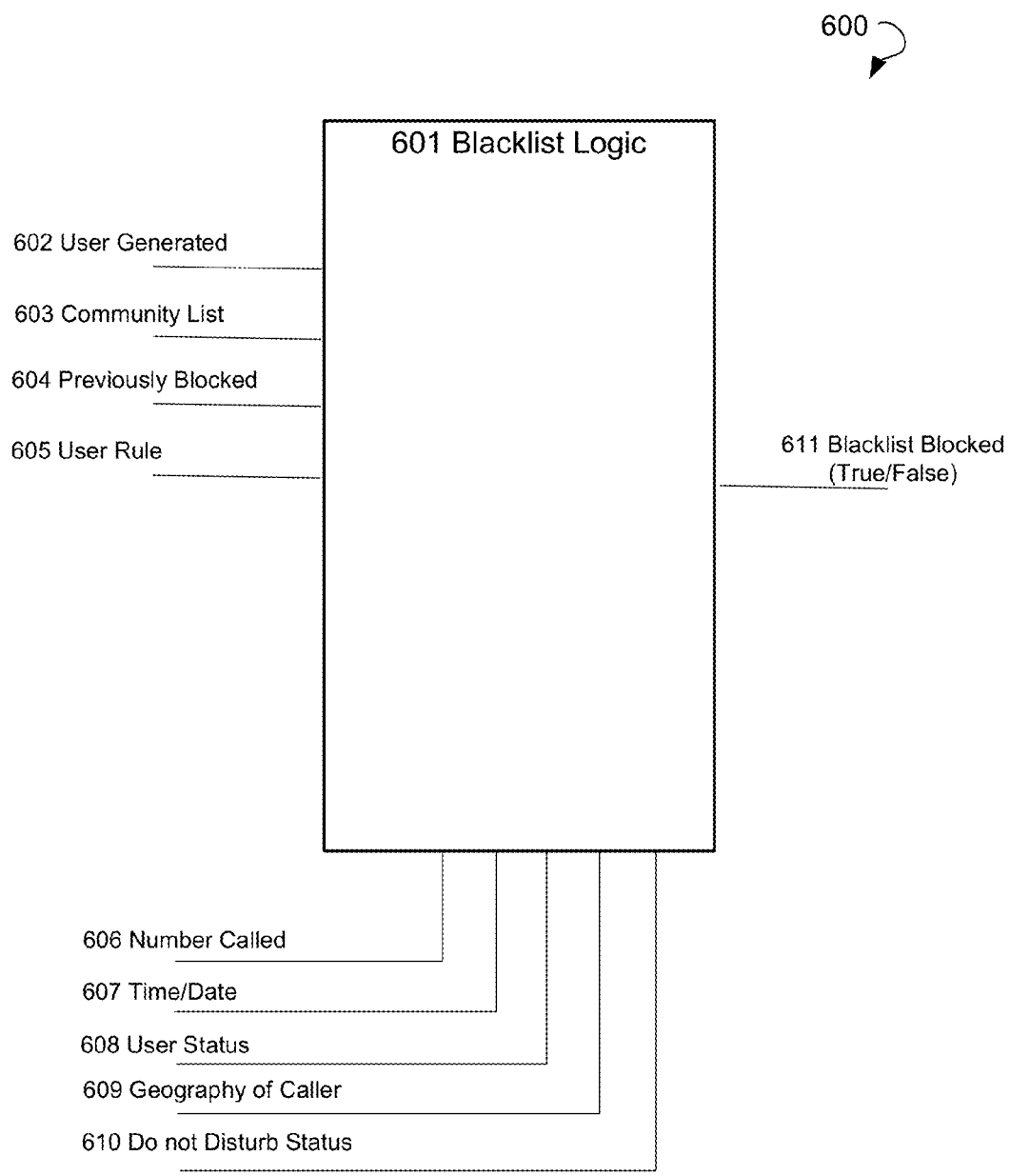
FIG. 6 is a flow chart showing logic for creating a blacklist, according to an example embodiment.

FIG. 6 shows a flow chart 600 illustrating how the blacklist may be composed and evaluated for driving the decisions of step 304 of FIG. 3. The blacklist may consist of caller numbers associated with callers from whom the user may not want to receive calls. The user may be given several options for what numbers may go into the blacklist. The list of options may include user generated numbers 602 (i.e., numbers that the user may enter as blacklisted). The list of options may further include community list numbers 603 (i.e., numbers entered in a community blacklist that may be generated by the network operator or crowd-sourced from a community of users). The community blacklist may include undesired numbers from multiple sources, including numbers known to be used for calls to large numbers of subscribers in the network. Most residential telephone users may call fewer than 20 different numbers in a given month. Therefore, an inbound caller who has called, for example, 100 or even 1,000 different numbers on a single telephone network in a given month can reasonably be classified as a spam caller. Furthermore, the community blacklist may include numbers known from network calling records to be used for calling phone numbers in sequence.

In an example embodiment, the community blacklist may include numbers blacklisted in multiple blacklists of individual users, numbers found in global blacklists published by third party or public sources, and numbers that have previously called "honeypot" numbers. The "honeypot" numbers may be designed by the network operator to entice telemarketers and other undesired callers to call and engage in a manner which allows their intent to be revealed. For example, certain unassigned phone numbers may be connected to an IVR system which pretends to be a live caller asking a question. The IVR may then measure the pause before the caller responds, which may often be longer than usual when an automated telemarketing system connects the call. If the response detected does not begin with a predetermined phrase, then it may be concluded that the caller may not have heard the question due to the lag typically seen in automated dialers between call connection and an agent joining the call. This may mean that the caller may be an undesired caller, such as a telemarketer, and that the number should be blacklisted. Numbers that are known to have been out of service for a long time are also effective "honeypots" to attract undesired callers as it can be reasonably guessed that anyone calling a number that has been out of service for a long time may be either an undesired caller or has misdialed.

The list of options may further include previously blocked numbers 604 (i.e., numbers that have been previously blocked by the user). Furthermore, the list of options may include user rule numbers 605 (i.e., numbers from particular geographic locations, area codes or number wildcards for which the user has created a rule that causes them to be blocked).

Furthermore, the list of options may include numbers calling special phone numbers 606 that the user may provide only to persons from whom the user may never want to receive calls or whose calls would be sent directly to voicemail, and so forth. For example, such a number may be provided to a person with whom the user may not wish to continue a relationship.

FIG. 6 shows how the various blacklists can be further qualified by time of day, day of week, time of year 607, user status 608 provided by the user, or geographic location 609 of the caller as determined by the caller ID. A function can be generalized and integrated with a Do Not Disturb 610 function to give users greater control over their privacy. Do Not Disturb 610 can be further customized with a scheduling system that may identify personal preferences as to when calls may or may not be accepted. Once a call has passed the rejection tests, the call may be compared to the schedule before completion. The calls outside the assigned time windows may have their destination assigned in the same fashion as rejected calls or may be forwarded to a voicemail. The scheduled Do Not Disturb may have an Always OK list to allow certain numbers to call outside the scheduled times. The various lists and criteria may combine in logic block 601 to produce a decision 611 as to whether the caller may definitely be prevented from completing the call.

Figure 7:
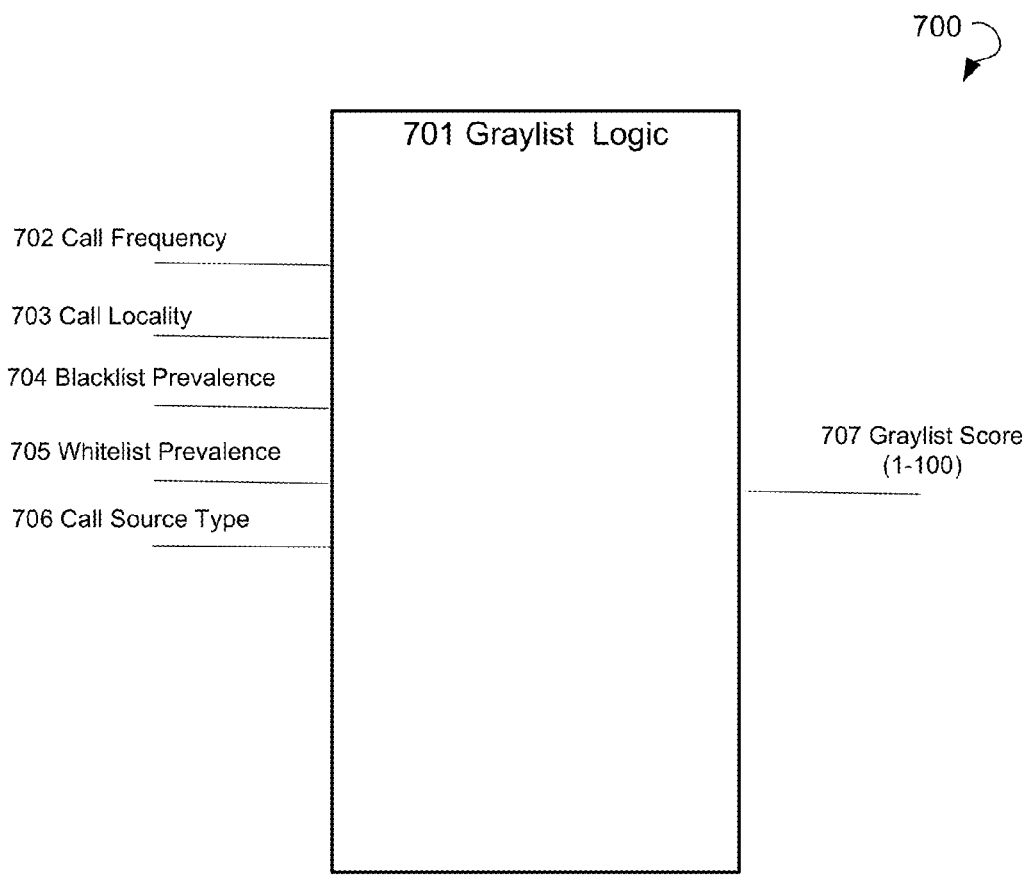
FIG. 7 is a flow chart showing logic for creating a graylist, according to an example embodiment.

FIG. 7 shows a flow chart 700 illustrating how callers, who are neither whitelisted nor blacklisted, may be graded and assigned a score to determine if calls from the callers may be put through to the user. Unlike the definitive judgments made by the whitelist logic of FIG. 5 or blacklist logic of FIG. 6, the assessment of FIG. 7 may be considered as a "graylist" logic 701 in which judgment is not binary. Factors that affect the graylist score 707 or caller desirability score may be heuristic and dependent upon a wide variety of data sources, some of which were mentioned previously and which may also drive the whitelist or blacklist judgments (where the user has chosen to treat them as if they were binary factors). For example, some users may take an aggressive view toward any number that has called a honeypot and simply disallow calls from those numbers. Other users may choose not to include that factor in the blacklist determination and instead incorporate the factor into the graylist score 707. The factors which are particularly suited to influencing the graylist score 707 may include a call frequency factor 702 (i.e., the frequency with which the caller has called a network telephone number today or in the past week or month). If a network operator with several hundred thousand phone numbers detects that the same caller is calling many of its users over a short period of time, then this may be a strong indication that the caller is a junk caller and, therefore, an undesired caller. For a typical network with high affinity (the tendency for users who are acquaintances to share the same telephone service), a typical residential user may call fewer than 25 numbers per million subscribers in a given month. In the current embodiment, a graylist score 707 may be set to equal the number of different on-network phone numbers called by the user in the last 30 days, minus 25

The factors influencing the graylist score 707 may further include a call locality factor 703. If a caller calls numbers in sequence, that may be an indication of a junk caller. In an example embodiment, the factor may be an integer indicating the length of the longest run of sequentially dialed numbers in the last 30 days. In an example embodiment, this graylist component score may be set to 20 times this number. Accordingly, a caller who dialed five phone numbers in sequence may get a graylist score 707 of 100 for just this component and the caller may be almost certainly a junk caller and, therefore, an undesired caller.

A blacklist prevalence factor 704 may mean that the caller has been blacklisted by many other users, which may be an indication of a junk caller. In an example embodiment, this graylist component score may be set to be 10 times an integer indicating the number of users in the network who have this number in their personal blacklist.

A whitelist prevalence factor 705 may mean that a caller is found on many user whitelists or has been called frequently by users on the network, which may be an indication that the call is valuable and should not be blocked. In an example embodiment, this graylist component score may be set to be −10 times an integer indicating the number of users in the network who have this number in their personal whitelist.

A call source type factor 706 may include calls from mobile numbers that are unlikely to be from junk callers, as most telemarketers operate from fixed locations using landlines instead of mobile phones. In an example embodiment, this graylist component score may be set to be −50 if the call is coming from a mobile phone number.

According to an example embodiment, each of the factors above may be weighted and added or subtracted as they apply to a particular caller. The resulting score may be normalized in a range from 0 to 100 and then passed to the rest of the screening process.

Figure 8:
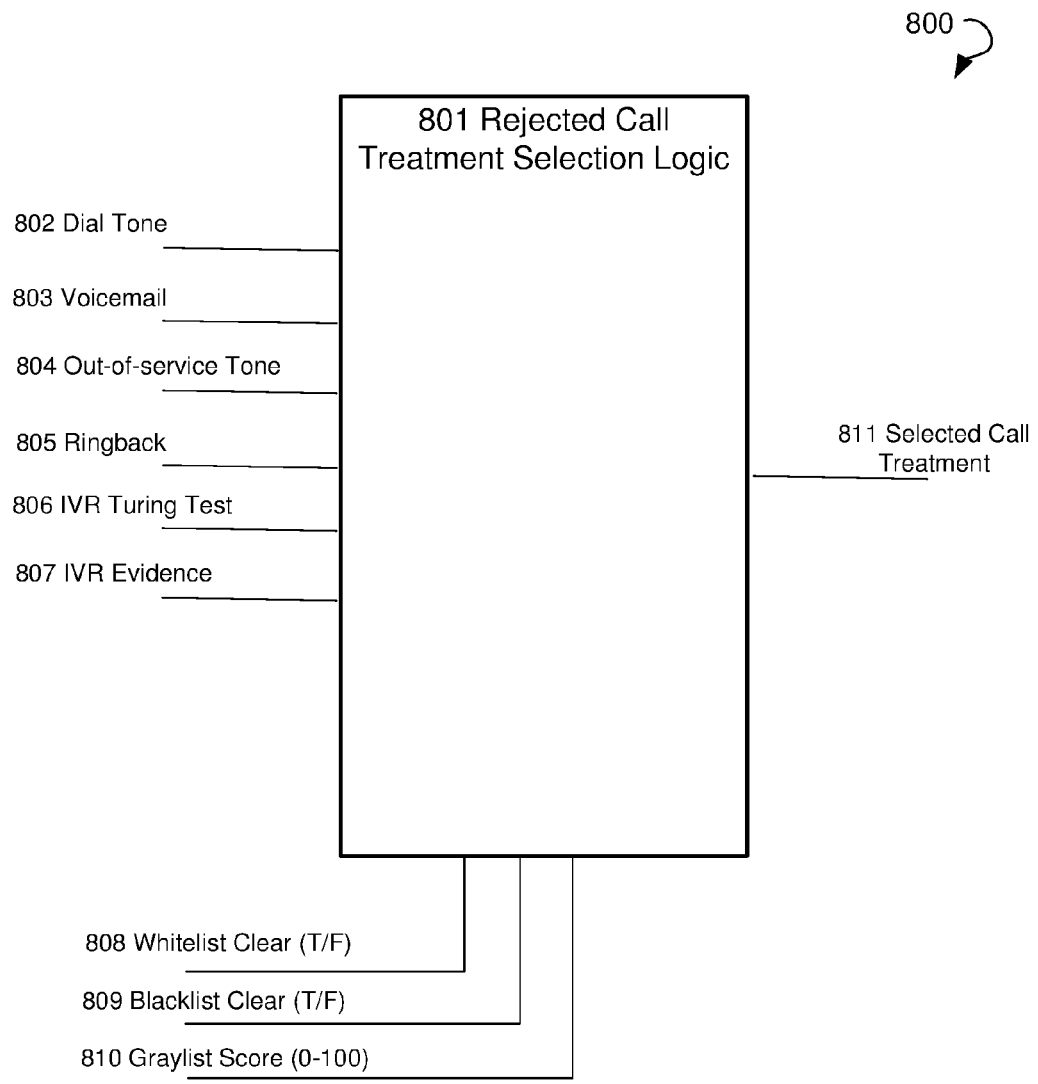
FIG. 8 is a flow chart showing logic for handling of rejected calls, according to an example embodiment.

FIG. 8 is a flow chart 800 illustrating the treatment for rejected calls. Since the system described herein effectively filters calls without any disturbance of the user, it is possible to engage in a counterattack against telemarketers for calls that are rejected in order to discourage their activities and make them less profitable when calling numbers on the protected network. The system may provide the user with several options for handling rejected callers.

The handling options may include a dial tone option 802 so that the rejected calls are terminated with a dial tone. Furthermore, in case of a voicemail option 803, rejected calls may be passed to voicemail. The voicemail may be flagged so that the user does not waste time listening to the message. Alternatively, the user may want to listen to such messages to make sure that the settings are not inadvertently blocking calls from legitimate users.

An out-of-service tone option 804 may be used, according to which rejected calls may be given the out-of-service tone, which may cause some automatic dialing systems to remove the number from their phone number list. This call treatment may prevent the undesired caller from wasting resources on a call that will never get through to an intended user. Furthermore, according to an example embodiment of option 805, there is no need to ring the phone for screened calls.

Furthermore, an IVR Turing test option 806 may be used to direct rejected calls to an IVR that simulates human conversation to prolong the time wasted by the undesired caller. For example, the IVR may answer the phone by asking the caller to wait for several minutes followed by a long pause. This may be followed by a Turing test wherein the challenge of the undesired caller may be to determine whether the IVR is a human or a machine while the purpose of the IVR challenge may be to prolong the conversation for as long as possible. Various personalities may be selected by the user for their Turing tests, for example a confused person whose conversation wanders, a drug addict who tries to take a message and forgets what he is doing and starts over, a dog owner who excuses himself to try to quiet the hound with barking in the background, and so forth.

A variation of the Turing Test call treatment may be an IVR Evidence 807 in which a further objective of the IVR may be to isolate the name of the caller and to determine whether the caller is covered by the constraints of the national "do not call" list. If the caller is covered, then the system may record the call as evidence for a complaint to an authority for the violation.

Selection 811 of which rejected call treatment to use may be based on what factors of logic block 801 caused the call to be rejected in the first place. For example, if the call is rejected because the caller is found on a user-generated blacklist 809 (implying that the user is quite confident that the call is from an undesired caller), then a more aggressive call treatment such as the Turing test may be employed. If, however, the call is rejected because of a marginal score 810 from the graylist scoring engine, then the call may be sent to voicemail in case a mistake was made in the scoring. Selection 811 may be also based on whether the caller is found on a user-generated whitelist 808. Selecting a call treatment may be as simple as directing the call to a server (such as a voicemail server or an announcement server) that connects the call and implements the desired treatment. Such servers are commonly employed using FreeSwitch or Asterisk soft switches.

Figure 9:
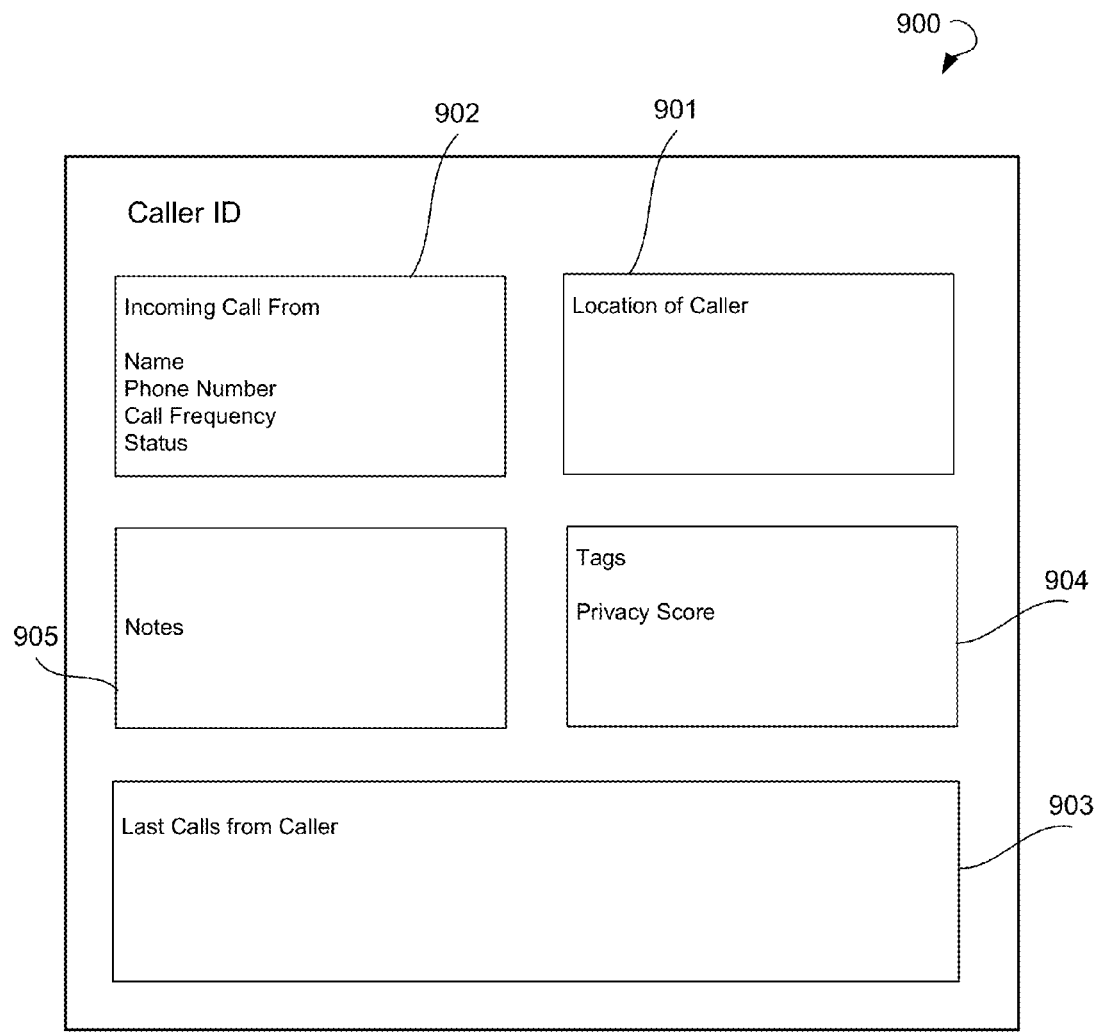
FIG. 9 illustrates a user interface for presenting a score of the caller, according to an example embodiment.

FIG. 9 illustrates a user interface 900, according to an example embodiment. The user interface 900 may present the information gathered by the system that may be relevant to a user deciding to answer a call. This information may be presented on the screen of a PC or, in compressed form, on the screen of a Digital Enhanced Cordless Telephone (DECT) handset or smartphone. The objective of the user interface 900 may be to provide the user with as much information as possible that may be relevant to the decision of the user to accept the call. The location 901 of the caller may be approximated based on the originating phone number or IP address (in the case of a VoIP call). Statistics 902 for previous calls, such as a number of calls over a given time period, or what their duration was, may be presented. The number 903 of calls to the service provider network may be provided along with their average call duration. Finally, the privacy score 904 from the graylist calculator might be provided. Notes 905 associated with the caller may be presented. Furthermore, on-screen options to whitelist or blacklist the caller may be presented.

Figure 10:
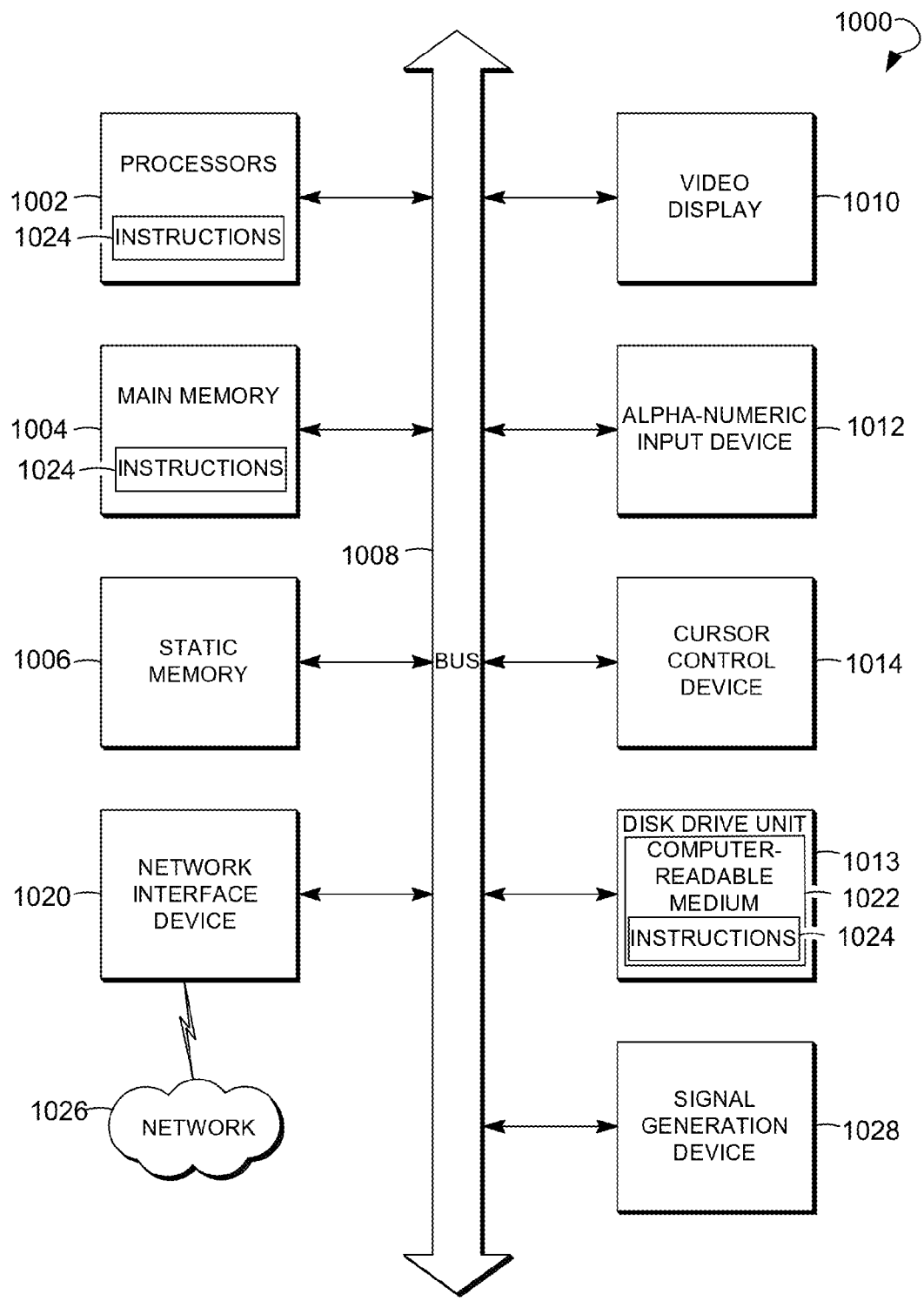
FIG. 10 shows a diagrammatic representation of a computing device for a machine in the example electronic form of a computer system, within which a set of instructions for causing the machine to perform any one or more of the methodologies discussed herein can be executed.

FIG. 10 shows a diagrammatic representation of a machine in the example electronic form of a computer system 1000, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a PC, a tablet PC, a set-top box (STB), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor or multiple processors 1002 (e.g., a central processing unit (CPU), a graphics processing unit (GPU), or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 may also include an alphanumeric input device 1012 (e.g., a keyboard), a cursor control device 1014 (e.g., a mouse), a disk drive unit 1013, a signal generation device 1028 (e.g., a speaker), and a network interface device 1020.

The disk drive unit 1013 includes a non-transitory computer-readable medium 1022, on which is stored one or more sets of instructions and data structures (e.g., instructions 1024) embodying or utilized by any one or more of the methodologies or functions described herein. The instructions 1024 may also reside, completely or at least partially, within the main memory 1004 and/or within the processors 1002 during execution thereof by the computer system 1000. The main memory 1004 and the processors 1002 may also constitute machine-readable media.

The instructions 1024 may further be transmitted or received over a network 1026 via the network interface device 1020 utilizing any one of a number of well-known transfer protocols (e.g., Hyper Text Transfer Protocol (HTTP)).

In some embodiments, the computer system 1000 may be implemented as a cloud-based computing environment, such as a virtual machine operating within a computing cloud. In other embodiments, the computer system 1000 may itself include a cloud-based computing environment, where the functionalities of the computer system 1000 are executed in a distributed fashion. Thus, the computer system 1000, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computing device 1000, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Thus, methods and systems for filtering telephone calls have been disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for filtering a telephone call, the method comprising:
   receiving from a caller, by a processor, the telephone call directed to a communication device associated with an intended call recipient, an Internet being disposed between the processor and the communication device;
   scoring, by the processor, the telephone call based on predetermined scoring criteria to create a score indicative of a desirability of the telephone call, the predetermined scoring criteria being provided by the intended call recipient;
   comparing, by the processor, the score to a predetermined threshold score;

based on the comparison, selectively classifying, by the processor, the telephone call as an unwanted telephone call; and selectively rejecting, by the processor, the unwanted telephone call.

2. The method of claim 1, further comprising, based on the score, putting the telephone call through to the communication device.

3. The method of claim 1, further comprising, based the score, adding the caller or a caller communication device to a whitelist or a blacklist.

4. The method of claim 1, further comprising providing screening of the telephone call by the intended call recipient to allow the intended call recipient to manually reject or allow the telephone call.

5. The method of claim 1, further comprising allowing the intended call recipient to grade the telephone call or effectiveness of a screening after the telephone call is completed.

6. The method of claim 1, further comprising automatically requiring a call back number to complete the telephone call.

7. The method of claim 1, further comprising providing a test to establish whether the caller is a human.

8. The method of claim 1, wherein the scoring is based on one or more of the following: whether the caller or a caller communication device are associated with a whitelist, a blacklist, or a graylist; a number of calls made to different phone numbers by the caller; sequence of calls made by the caller; and a call source type.

9. The method of claim 1, wherein the predetermined scoring criteria include network statistics, machine detections, and customized challenge and response.

10. The method of claim 1, wherein the intended call recipient manually adds the caller or caller communication device to a blacklist or a whitelist.

11. The method of claim 1, wherein the telephone call is automatically rejected if a caller Identification (ID) associated with the telephone call is blocked or anonymous.

12. A system for filtering a telephone call, the system comprising:

a processor configured to:

receive from a caller the telephone call directed to a communication device associated with an intended call recipient, an Internet being disposed between the processor and the communication device;

score the telephone call based on predetermined scoring criteria to create a score indicative of a desirability of the telephone call, the predetermined scoring criteria being provided by the intended call recipient;

compare the score to a predetermined threshold score;

based on the comparison, selectively classify the telephone call as an unwanted telephone call; and selectively reject the unwanted telephone call; and a memory unit configured to store data associated with the predetermined scoring criteria, the predetermined threshold score, a whitelist, and a blacklist.

13. The system of claim 12, wherein the processor is further configured to, based on the score, put the telephone call through to the communication device.

14. The system of claim 12, wherein the processor is further configured to, based on the score, add the caller or a caller communication device to the whitelist or the blacklist.

15. The system of claim 12, wherein the processor is further configured to provide screening of the telephone call by the intended call recipient to allow the intended call recipient to manually reject or allow the telephone call.

16. The system of claim 12, wherein the processor is further configured to allow the intended call recipient to grade the telephone call or effectiveness of a screening after the telephone call is completed.

17. The system of claim 12, wherein the processor is further configured to automatically require a call back number to complete the telephone call.

18. The system of claim 12, wherein the processor is further configured to provide a test to establish whether the caller is a human.

19. The system of claim 12, wherein the processor rejects the unwanted phone call in response to a caller Identification (ID) associated with the phone call being blocked or anonymous.

* * * * *